W. K. Greene, Jr.
Jacquard Weaving.

N° 5,939.  Patented Nov. 28, 1848.

W. K. Greene, Jr.
Jacquard Weaving.

N° 5,939.    Patented Nov. 28, 1848.

UNITED STATES PATENT OFFICE.

WM. K. GREENE, JR., OF SCHENECTADY, NEW YORK.

JACQUARD.

Specification of Letters Patent No. 5,939, dated November 28, 1848.

*To all whom it may concern:*

Be it known that I, WILLIAM K. GREENE, Jr., of Schenectady, in the county of Schenectady and State of New York, have invented a certain new and useful Improvement in Jacquard Apparatus for Weaving Three-Ply Carpeting, &c.; and I do hereby declare that the same is fully described and represented in the following specification and accompanying drawings, letters, figures, and references thereof.

Figure 3:
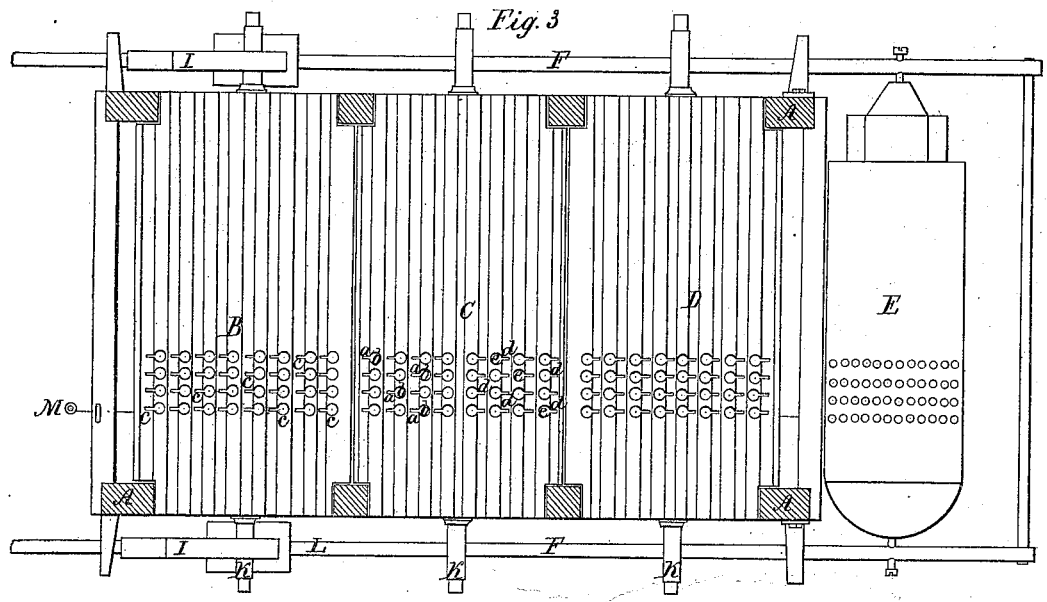
Figure 1:
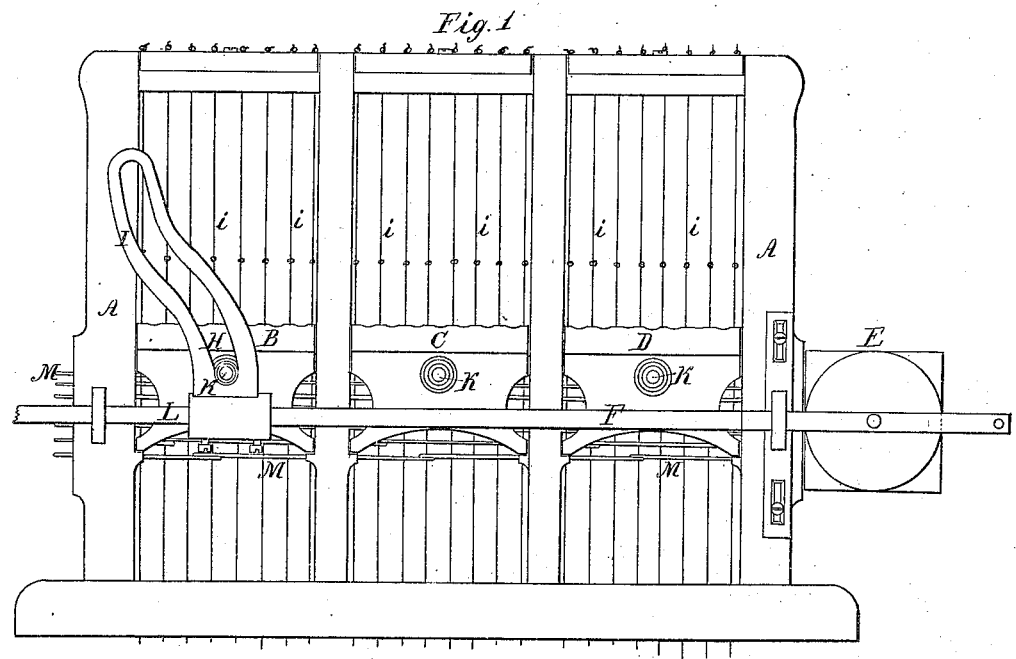
Figure 2:
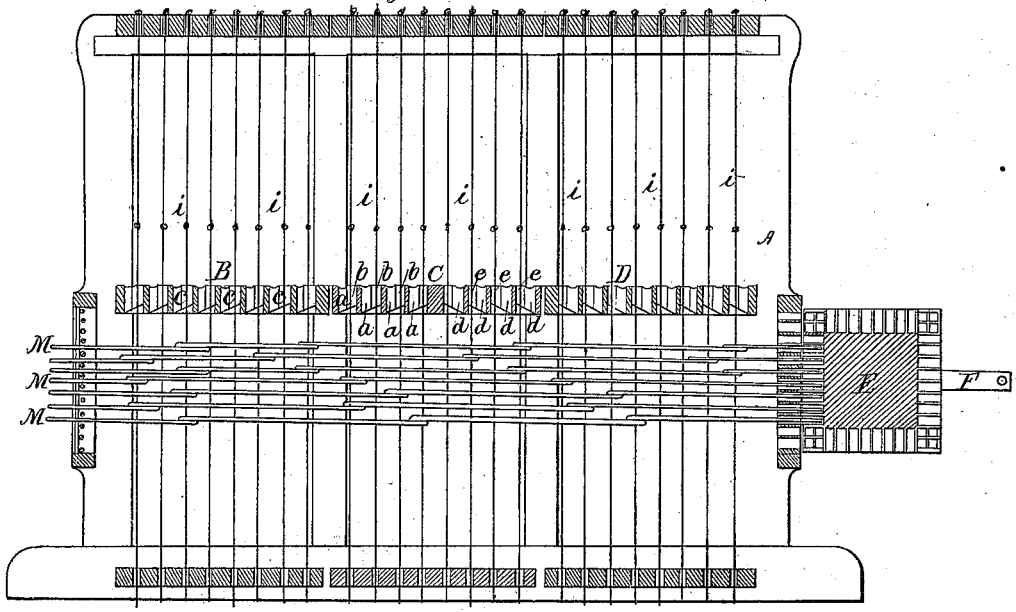
Figure 5:
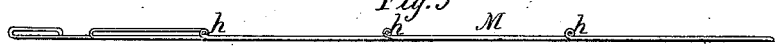
Figure 4:
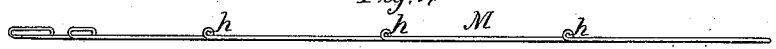

Of the said drawings Figure 1, denotes a side elevation of my improved jacquard apparatus. Fig. 2, is a vertical section taken through the trap boards and just in rear of the side represented in Fig. 1. Fig. 3, is a horizontal section taken just over the trap boards, and exhibiting the arrangement of the holes and saw slits of the same. Fig. 4, is a top view of one of the wires through which the strings pass. Fig. 5, exhibits the manner in which it may be formed to operate to better advantage.

In the aforementioned drawings A, Fig. 1, denotes the frame of a jacquard. B, C, D, are three trap boards arranged together as seen in the drawings. Each of said boards is to have suitable mechanism applied to it to elevate and depress it at the proper times. E, is the pattern prism, and F, the slide frame of said prism, the same being operated by one of the trap boards in consequence of each of its journals K, being made to pass through one of two cam slots H, of an arm I, which extends upward from the rod L, of the prism frame.

The middle trap board C, has all the saw slits $a$, $a$, &c., of the string holes $b$, $b$, &c. on one side of the middle of it, arranged in a direction from the middle or in the same direction as those of the holes $c$, $c$, of the trap board B. The remaining holes $c$, $c$, of the middle trap board have their saw slits $d$, $d$, arranged in a direction toward the trap board D, or in the same direction as those of the trap board D, as seen in the drawings. In conjunction with the three boards having their holes and saw slits arranged as described. I make use of a series of wires M, M, each of which is formed with the three eyes $h$, $h$, $h$, and in other respects as seen either in Fig. 4, or Fig. 5.

By the above described arrangement I am enabled to make but three trap boards, and one pattern card and prism answer the purpose for which it has been customary to use four trap boards, two pattern cards and two prisms. I thus very much simplify the jacquard machine particularly in its application to the weaving of three-ply carpeting. I do not confine my invention to the making the saw slits of exactly one half the number of string holes of the middle trap board to run in a direction opposite to those of the remaining holes as it may be some times convenient to make those of less than half the number of holes extend in one direction or toward the trap board next adjacent while the saw splits of the remaining holes are disposed in opposite directions. The knotted strings which pass through the holes of the trap boards are seen at $i$, $i$, &c.

What I claim as my improvement is—

The manner in which I have constructed the three trap boards, or in other words, the peculiar manner of arranging the saw splits and holes of the middle and two adjacent trap boards whereby they may be used in connection with the series of wires each of which is constructed with the three eyes and in other respects as exhibited in either of the Figs. 4, 5; the said improvement enabling me to use but three trap boards, one pattern card and prism, instead of four trap boards, two pattern cards and two prisms, as heretofore employed—they simplifying the mechanism and weaving process.

In testimony whereof I have hereto set my signature this twenty-second day of March A. D. 1848.

W. K. GREENE, JR.

Witnesses:
R. H. EDDY,
CALEB EDDY.